United States Patent [19]

LaRussa

[11] Patent Number: 4,474,501

[45] Date of Patent: Oct. 2, 1984

[54] OPTICAL SIMULATION OF SCENIC TRANSLATION

[75] Inventor: Joseph A. LaRussa, Yorktown Heights, N.Y.

[73] Assignee: Farrand Optical Co., Inc., Valhalla, N.Y.

[21] Appl. No.: 394,106

[22] Filed: Jul. 1, 1982

[51] Int. Cl.³ ............................................. G09B 9/02
[52] U.S. Cl. .................................... 434/43; 364/522; 358/104
[58] Field of Search .......................... 434/30, 38, 43; 358/104; 364/522

[56] References Cited

U.S. PATENT DOCUMENTS

| | | | |
|---|---|---|---|
| 3,415,946 | 12/1968 | Bedford, Jr. ........................... | 434/43 |
| 3,826,864 | 7/1974 | Pau Fue ................................ | 434/43 |
| 4,001,499 | 1/1977 | Dowell ................................. | 434/43 |
| 4,177,579 | 12/1979 | Peters et al. ........................ | 434/43 |
| 4,368,517 | 1/1983 | Louering ............................. | 434/43 |

Primary Examiner—Richard C. Pinkham
Assistant Examiner—Leo P. Picard
Attorney, Agent, or Firm—Handal & Morofsky

[57] ABSTRACT

An apparatus (10) simulates scenic translation and comprises simulator controls (64) which generate signals (18–26) corresponding to the horizontal position of a vehicle. Video storage unit (12) generates a raster (54) including video information (58) representing a scene to be viewed. A microprocessor (65) responsive to the simulator controls generates control signals for selecting a portion (50 or 52) of said raster corresponding to the position of the vehicle. Horizontal and vertical delay gates (112,114) responsive to the microprocessor select a portion of each line in said raster. A video monitor displays the selected portions.

13 Claims, 6 Drawing Figures

OPTICAL SIMULATION OF SCENIC TRANSLATION

FIELD OF THE INVENTION

The invention relates to an optical simulation method and apparatus, and more particularly to a method and apparatus for optically simulating the translation of a visual scene relative to an observer such as a pilot in an aircraft or a driver in a land vehicle such as a tank.

BACKGROUND OF THE INVENTION

Optical simulation techniques and apparatus are available for simulating the movement of a perceived scene relative to rotational movement of the head of an observer in one or more axes. In these situations, it is merely necessary to move a representation of the scene across the field of view of the observer, and this motion gives the observer a visual effect corresponding to rotation with respect to a real world scene. The simulation of translation of the scene relative to the observer is a complex phenomena. In order to provide the effect of an observer translating himself, or moving laterally with respect to the real world scene, the vanishing point (and horizon) of the same must not change its apparent position with respect to the observer since it is by definition at a great distance, and any relatively small lateral motion of the observer cannot change the apparent direction of objects on the horizon. The maximum effect of the translation of a scene must occur at the portion of the scene closest to the observer and must diminish proportionately going toward the horizon or farthest distance from the observer. The present invention provides method and apparatus for simulating this motion.

SUMMARY OF THE INVENTION

The present invention comprises a method for optically simulating the translation of a visual scene relative to an observer by providing a representation of the visual scene perceived by an observer. The representation has a portion representing a portion of the scene distal to the observer and another portion representing a portion of the scene proximal to the observer. Each strip is associated with a distance from the observer. The representation is arranged into a plurality of linear parallel strips extending in a direction parallel to the desired translation. Finally, one of the strips in the distal portion is fixed and each of the strips between the fixed strip and the proximal portion of the representation is moved in a continuous fashion; each strip which is a function of its associated distance and the movement of the observer to be simulated.

The invention also provides apparatus for carrying out the method described above.

BRIEF DESCRIPTION OF THE DRAWINGS

On way of carrying out the invention is described in detail below with reference to the drawings which illustrate only one specific embodiment of the invention, in which.

DETAILED DESCRIPTION OF THE DRAWING

Figure 1:
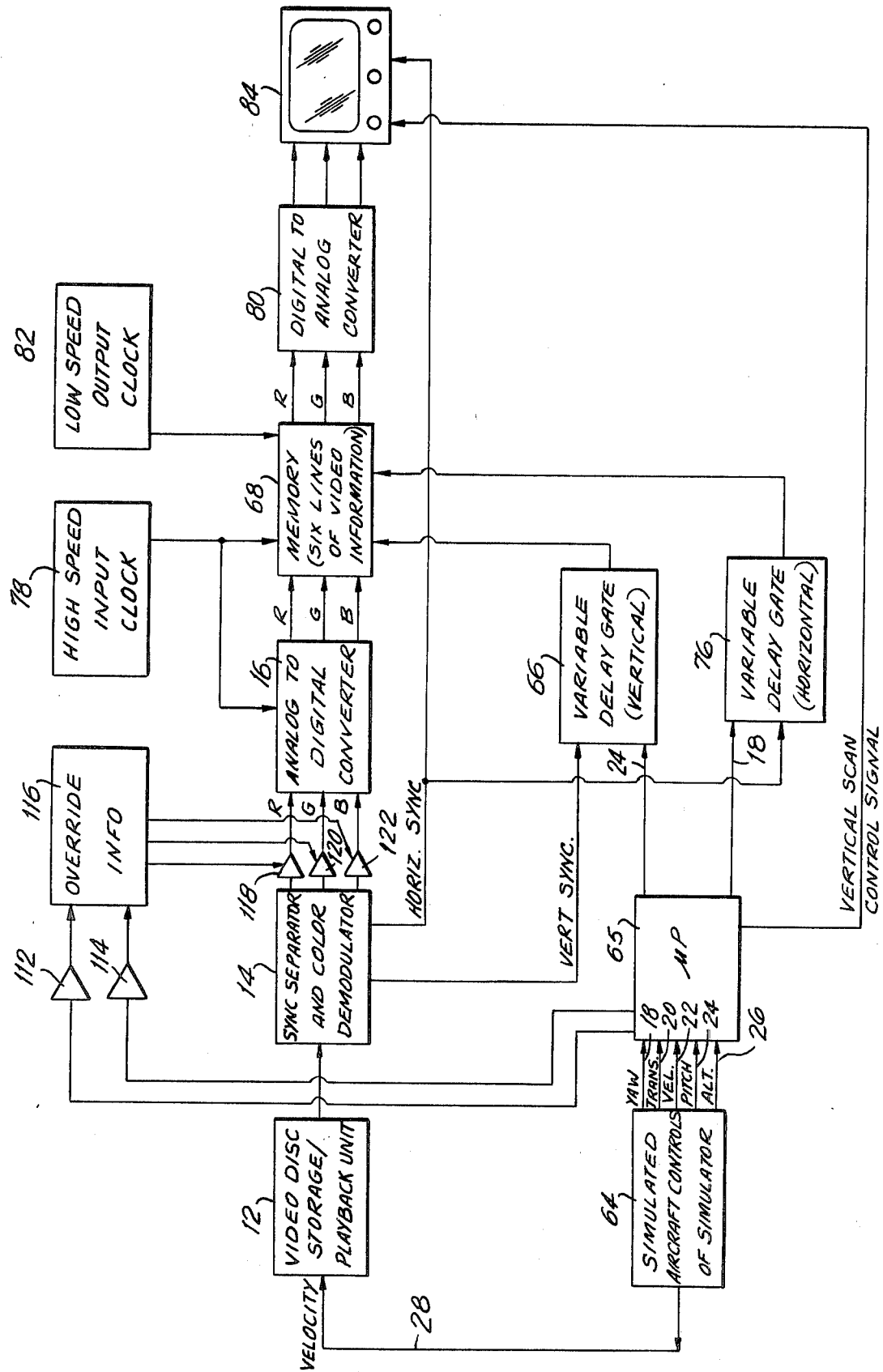
FIG. 1 is a block diagram of a scenic translation system constructed in accordance with the present invention.

A video simulation system 10 constructed in accordance with the present invention is illustrated in FIG. 1. For purposes of clarity, the system will be described in conjunction with an aircraft. Generally, video information in the form of successive frames (which is gathered during an actual flight to be thereafter simulated) is stored in a video playback device such as a video disc storage unit 12. The output of video storage unit 12 is sent to a color demodulator and synch separator 14 which outputs red, green and blue video signals together with horizontal and vertical synchronization information. The video output of synch separator 14 is sent to an analog-to-digital converter 16. A combination of storage unit 12, synch separator and color demodulator 14, and analog to digital converter 16 generally provide video information corresponding to the terrain over which the vehicle, whose operation is being simulated, would be traveling. Generally, by varying the speed with which sequential frames stored in storage unit 12 are displayed and selecting the portions of the frames and treating the information in the frames to vary perspectives, the appropriate scenic information is displayed to the person using the simulator.

Turning to that part of the system 10 which controls the selection and treatment of video information stored in storage unit 12, information concerning the yaw, translation, horizon, pitch, altitude and speed of the system is furnished to the simulator via input busses 18-26. Velocity information is introduced into the system via velocity buss 28. Video storage unit 12 is responsive to velocity information carried over buss 28 to produce sequential frames at increasing rates in response to increasing velocity information.

By way of example, if the information in storage unit 12 was generated in the form of a video disc taken with a standard video camera having a frame rate of thirty frames per second while the vehicle was moving at a speed of one hundred fifty miles per hour, the playback unit would, in response to one hundred fifty mile per hour velocity information carried over buss 28 playback the frames at the rate of thirty frames per second. If, on the other hand, velocity information indicates a speed of seventy-five miles per hour velocity information will be varied linearly to produce frames at the rate of fifteen frames per second. Conversely, if the velocity information on buss 28 indicates a speed of three hundred miles per hour, frames will be generated by storage unit 12 at the rate of sixty frames per second. In such manner the rate at which frames are produced by storage unit 12 will be varied linearly in response to the velocity information carried by buss 28.

Figure 2:
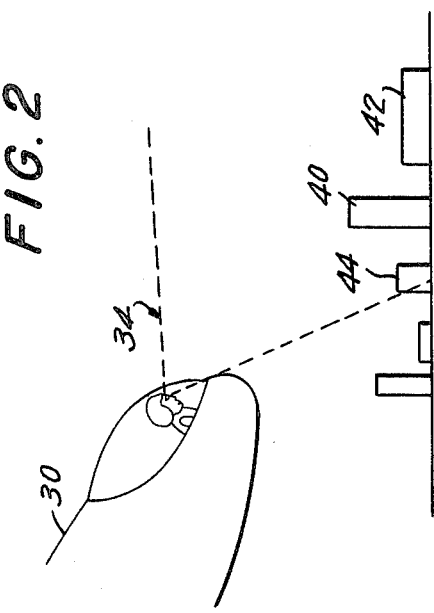
FIG. 2 is a schematic diagram illustrating the field of view of a pilot in a plane oriented in downward flight.
Figure 3:
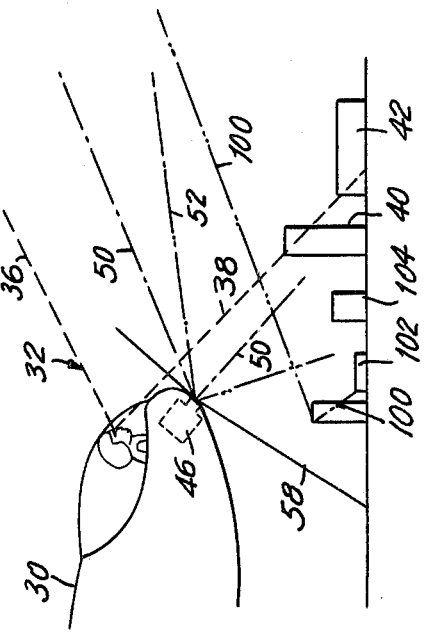
FIG. 3 is a schematic diagram illustrating the field of view of a pilot in a plane oriented in level flight.

As illustrated by FIGS. 2 and 3, the attitude of the vehicle, such as an aircraft 30, determines the view which will be apparent through the windscreen to the operator. Thus, if an aircraft is flying in level flight, as illustrated in FIG. 3, the field of view 32 of the pilot 34 will be defined between lines 36 which correspond to the top of the pilot's helmet and line 38 which corresponds to the dashboard of the aircraft. Thus all objects, including the top of building 40 and most of building 42, within the field of view 32 will be visible to the operator of the aircraft. If, on the other hand, the attitude of the aircraft were changed to that illustrated in FIG. 2 where the aircraft has a substantial pitch, all of buildings 40 and 42 and most of building 44 will come into the field of view 34 of the pilot.

If, by way of comparison, the video information stored in storage unit 12 was gathered by flying over the area with a wide angle camera 46 at the bottom of the aircraft, the recorded picture stored in storage unit 12 will contain a far wider field of view than that seen by the pilot. Dependent upon the pitch of the aircraft, selective parts of the picture may be selected to simulate the actual field of view of the pilot regardless of the attitude of the aircraft. Naturally, when the video information is recorded using camera 46, the aircraft must be maintained in level flight in order to provide video information with respect to a constant attitude and the field of view of camera 46 must be much larger than the field of view of a pilot sitting in the aircraft.

Thus, if one wished to simulate the field of view of a pilot flying a plane with an attitude such as that illustrated in FIG. 3, one would select that portion of the picture corresponding to the field of view defined by upper field of view 50. If, on the other hand, one wished to simulate the scenic view which is seen by a pilot in the position and attitude illustrated in FIG. 2, one would select that portion of the field of view 58 of camera 46 illustrated by lower field of view 52. Inasmuch as the orientation of the scanning lines in camera 46 are parallel to the axis of the wings of the aircraft, the selection of upper field of view 50 or lower field of view 52 merely becomes a matter of selecting only a portion of the scanning lines of the raster generated in response to the video signal produced by camera 46 and replayed by storage unit 12.

Figure 4:
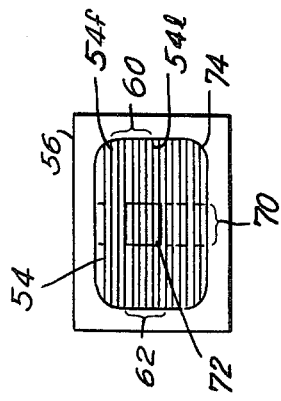
FIG. 4 is a diagramatic representation illustrating the selection of a limited amount of video data from an overall video signal.

Viewed another way, if we considered the picture generated by storage unit 12 as a frame comprising a multiplicity of raster lines 54 (FIG. 4) on a monitor 56, all of the raster lines 54 would correspond to the overall field of view 58 of the camera. An upper portion 60 of raster lines would correspond to the upper field of view 50 while a lower portion 62 of raster lines would correspond to the lower field of view 52. Considering, for example, the case of the upper field of view defined by portion 60, the first raster line 54 f within portion 60 would be the upper limit of the field of view and the last raster line 54 l would be the lower limit of the field of view. Raster line 54 f would occur at a fixed time after the initiation of the vertical synch pulse and raster line 54 l would occur at a period of time thereafter. The time between the beginning of each frame and raster line 54 f and raster line 54 l will be a function of the pitch of the aircraft. Such pitch information may be generated by the controls 64 associated with the simulator. All times may be calculated by micro-processor 65, using elementary trigonometric relationships. Controls 64 are responsive to the vertical synch pulse to provide a pulse signifying the occurence of raster line 54 f and a second pulse indicating the start of raster line 54 l. Pitch information along bus 24 together with the vertical synch signal are sent to a gate 66 which provides a vertical enabling signal to memory 68.

In similar fashion, dependent upon the yaw of the aircraft, a horizontal portion of the field of view 58 will be visible to the pilot. This portion 70 is illustrated by the dotted lines in FIG. 4. Thus, only the small portion 72 of the overall picture 74 generated by storage unit 12 represents the line of sight of the pilot. In similar fashion, the output of the simulator controls generate a yaw signal sent along bus 18 to a variable delay gate 76. Dependent upon the yaw of the simulated aircraft, variable delay gate 76 will select that portion 70 of overall picture width of picture 74 which corresponds to the yaw of the aircraft and, accordingly, that portion of the horizontal field of view of the operator of the aircraft. This gating information (which controlled by microprocessor 65 in accordance with elementary trigonometric principles) will effectively send an enabling signal at the proper time corresponding to the beginning and the end of small portion 72 of the picture.

When memory 68 receives enabling signals from both gate 66 and 76 it proceeds to simultaneously load into a first position in memory the red, green and blue video information corresponding to a single raster line in small picture portion 72 of the overall picture 74. This information is clocked in by high-speed input clock 78.

Once a line of tri-color information has been read into the memory in the first position, the information may be read out into a digital-to-analog converter 80. The rate at which this information is read out is determined by a low speed output clock 82 which clocks out the information at such a speed that the duration of the clockout time for single tri-color lines will be equal to the duration of a single tri-color line in a standard television picture. This information received by digital-to-analog converter 80 is then converted into an analog signal and sent to TV monitor 84 which is placed in front of the screen of a simulator, thus simulating the view from the aircraft for other vehicles whose operation is being simulated.

As noted above, starting and stopping points for vertical and horizontal gating of gates 66 and 76 are determined using simple trigonometric functions and the pitch, yaw, altitude and ground point associated with the aircraft. By ground point in this context is meant the point on the ground directly underneath the aircraft.

In the event that one wished to simulate translation of the aircraft, views above the horizon of the video frame produced by storage unit 12 would not appear to change position. This is because as a plane moves left or right as it is traveling, the points above the horizon (the moon, etc.), which are effectively at infinity, do not change position as long as the yaw of the aircraft remains constant. If we consider a detailed analysis of such a picture portion 72 the portion of the picture above horizon 86 (FIG. 5) would remain unaltered in response to variations in translation. On the other hand, (with respect to points below the horizon), those points furthest away from the aircraft and in closest proximity to the horizon will appear to vary in position only a small amount while those points more directly underneath the aircraft will appear to vary very drastically in position. Thus, in the event that the aircraft were to move in a leftward direction those portions of the overall picture 74 illustrated in FIG. 5 and designated by lead line 88 would come into the field of view of the pilot. With respect to portion 88, the exact point at which each partial raster line 90 would begin and end would thus be a function of the translation of the aircraft. However, all points of the picture coinciding with center line 92 would appear to be directly under the flight path of the aircraft. Thus, the view seen by the pilot would correspond to each of the raster lines beginning at the same horizontal point of the screen, these points being defined by vertical line 94. The relationship between the actual starting time is defined by edge 96 and the actual beginning times for each of the raster lines which begin at points defined by line 98 is a simple trigonometric function determined by the aforesaid factors and the translational position of the aircraft. These relationships are simple trigonometric functions which are calculated by microprocessor 65 which sends appropriate control information to variable delay gates 66 and 76. As discussed above, this gating information instructs memory 68 to receive a particular tri-color line portion signified, for example, by one of the raster lines 90 and loaded into a first portion of memory. When such a particular line has been loaded, it is immediately played out at a lower speed in response to clock 82. As clock 82 is causing the first line to be read out of memory at the slow speed, clock 78 is controlling the loading of a second line of tri-color video information in the small picture portion 72 of the picture into a second position in memory. Once this second position in memory is loaded with the complete information to be played out, this information in the second position is played out at the slower speed in response to the low speed clock 82 while a third line of tri-color information is loaded into the first position in memory, and so forth until a complete picture is displayed, after which the entire process is repeated for the next frame of the picture.

Figure 6:
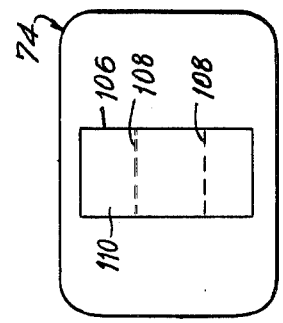
FIG. 6 illustrates the selection of data from an overall picture during a simulated change in altitude of an aircraft.

In similar fashion, changes in altitude will change that portion 72 of the overall picture which is to be displayed by the simulator. In particular, referring to FIG. 6, a greater portion of the overall field of view will enter the field of view of the pilot. This may be seen conceptually with reference to FIG. 3 here the field of view 100 of a low flying aircraft takes in most of building 102, and buildings 104, 40 and 42. This may be seen most clearly in FIG. 6 where that portion of the raster would be signified by portion 106. However, the picture would appear compressed within the space defined by horizontal lines 108. The exact position of raster lines 110 in portion 106 when positioned in the position seen by the pilot (and thus the various spacing between adjacent lines) will also be a function of simple trigonometric functions, and the position of the horizon which is generated as a result of the pitch of the aircraft. This information is generated by microprocessor 65 which sends an appropriate control signal to monitor 84 in the form of a vertical scan control signal.

An additional feature may be added to the invention by simulating the Vassey lights typically placed on aircraft runways. While the video information stored on the video disc can contain such information and will show the Vassey lights on approach, the Vassey lights will be the color associated with the particular position of the aircraft when the actual video picture stored in storage circuit 12 was made. Naturally, with variations in altitude, the color of the Vassey lights will change because of the directional and color-directional characteristics of the Vassey lights. Accordingly, a blacker than black signal may be dubbed into the video information stored in the storage circuit 12 at the points where the Vassey lights would appear in particular picture frames where the Vassey lights are visible. The actual proper color of the Vassey lights for the particular ground point translational position, and altitude of the aircraft may be calculated by microprocessor 65. This information would be a function of the various input information from simulator 64. Once a particular color is calculated, the microprocessor can send information to a pair of gates 112 and 114. Insofar as Vassey lights are usually two color systems, when gate 112 is activated it would tell override circuit 116 to instruct amplifiers 118-122 to feed in the first color into the analog-to-digital converter regardless of the color information presented. Likewise, when the Vassey lights should be a second color, the other gate is activated telling the override circuit 116 to instruct amplifiers 118-122 to send the other color to the analog-to-digital circuit 16. When neither of the gates is activated, amplifiers 118-122 act as simple linear amplifiers, and do not effect the color content or intensity of the signal output by the synch separator and color demodulator 14. Naturally, it may be desirable to vary the vividness with which the Vassey lights are displayed dependent upon the skill of the operator who is training on the simulator system.

Figure 5:
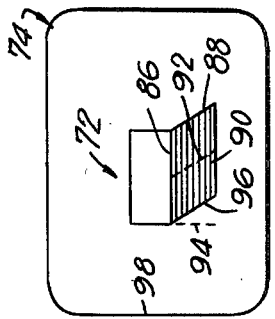
FIG. 5 illustrates the selection of data from an overall picture in the case of a lateral translation of the aircraft.

Finally, a further refinement may be made by varying the horizontal scan speed at each point along raster lines as illustrated in FIG. 5 in response to the actual point that the information shown in the raster line will actually occupy in the pilot's field of view. This will result in the shape of the portion 88 below the horizon being shaped other than as a parallelogram. However, the use of a simple parallelogram is a good first order approximation for most systems and is believed to be of primary commercial importance except in certain systems where extremely large ranges of translational deviation are envisioned.

While an illustrative embodiment of the present invention has been described, it is, of course, understood that various modifications will be obvious to those of ordinary skill in the art. Such modifications are within the spirit and scope of the invention which is limited and defined only by the appended claims.

I claim:

1. A method for simulating the translation of a visual scene relative to an observer comprising the steps of:
   (a) providing a representation of said visual scene viewable by an observer, said representation having a portion representing a portion of said scene distal to the observer, a portion representing a portion of said scene proximal to the observer, and portions representing portions therebetween;
   (b) dividing said representation into a plurality of linear parallel strips, each strip comprising a plurality of points, said strips extending in a first direction parallel to the desired translation; and
   (c) fixing one of the strips in the distal portion of said representation and positioning each of the other strips in continuous fashion, each strip being moved in the direction of translation by a distance which is a function of its simulated proximity to the observer and the magnitude of translation, so as to provide a more realistic perspective view of said visual scene to the observer.

2. A method as in claim 1, where said movement is a linear approximation of trigonometric functions which describe the movement of said points, in said linear approximation, said strips being displaced to form a parallelogram, wherein a pair of angles formed by said parallelogram are larger than ninety (90) degrees.

3. A method as in claim 1, where simulation of movement in a second direction at 90° to said first direction is simulated by varying the center-to-center spacing between adjacent strips.

4. A method as in claim 3, wherein said divided representation is generated by the steps of using a television camera to record a visual scene and wherein said individual strips are the raster lines output by said television camera.

5. A method as in claim 4, wherein said visual scene is from an elevated vantage point and includes landscape and sky and wherein points above the horizon between said landscape and sky are not shifted in said first direction.

6. A method as in claim 4, wherein a portion of each of said raster lines is selected and displayed as an apparent full raster line.

7. A method as in claim 6, wherein the distance between said displayed portions of raster lines varies in response to simulated positional shifts in directions perpendicular to said first direction.

8. A method as in claim 1, wherein translation is simulated visually for translation having two mutually orthogonal components, one of said components extending in said first direction and the other of said components extending perpendicular thereto, and further comprising the steps of shifting the position of each of the strips in a second direction perpendicular to said first direction by a distance which is a function of its simulated proximity to the observer and the magnitude of translation in said second direction.

9. A method as in claim 8, wherein said strips are raster lines generated by a video display, said first direction being oriented parallel to the horizon in said visual scene, said second direction being oriented parallel to altitudinal translation, and further comprising the steps of providing a plurality of visual scenes and processing them in accordance with the above steps, and wherein only a selected one of said scenes is displayed to the observer, said selection being made in accordance with the simulated location of the observer in a third direction perpendicular to said first and second directions.

10. A method as in claim 1, wherein the step of positioning said plurality of parallel strips comprises the operation of storing said representation in a memory device.

11. A method as in claim 10, wherein said memory device is a digital memory device and the output of said memory device is controlled by a microprocessor.

12. A method for three dimensional simulation of translation of an airborne vehicle over a terrain within limited deviations from a predetermined path and orientation, comprising the steps of:
(a) flying a real vehicle over a terrain;
(b) recording the visual scene from said vehicle using a television camera which produces the scene as a signal containing a plurality of raster frames representing the visual scene from successive points in space;
(c) playing back and displaying the raster frame that corresponds to the simulated position of a pilot during a simulation by scanning a television display each raster frame comprising a plurality of lines;
(d) selecting a portion of said raster as a function of a simulated field of vision; and
(e) varying the horizontal position of selected portions of the raster lines on said television display in response to simulated horizontal positional deviation from the position at which said frame was recorded and varying the density at which said lines are displayed in response to simulated altitudinal deviation to achieve a simulation of perspective variations so as to provide a more realistic perspective view of said visual scene to an observer.

13. A method as in claim 12, wherein the position and portion of raster lines on said television display is varied in response to simulated angular and translational positional deviation from the position at which said frame was recorded to achieve a simulation of perspective variation.

* * * * *